Dec. 14, 1937.　　　　　G. E. POPE　　　　　2,102,280
CUSHIONED CLUTCH PLATE
Filed April 17, 1937　　　2 Sheets-Sheet 2
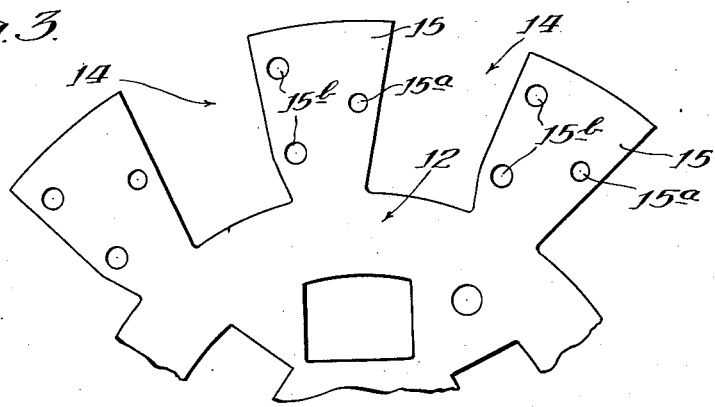
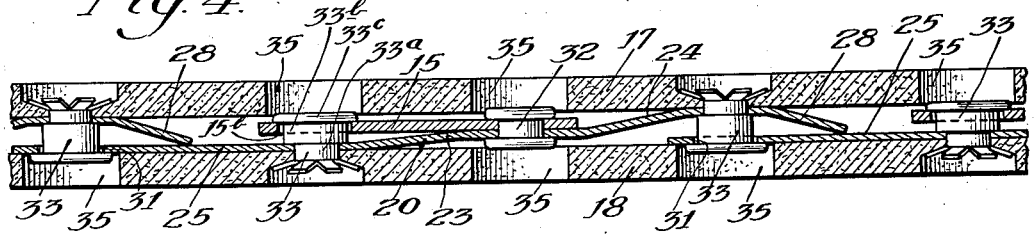
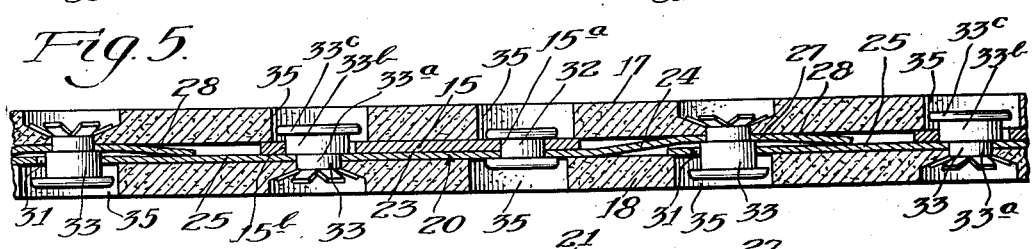
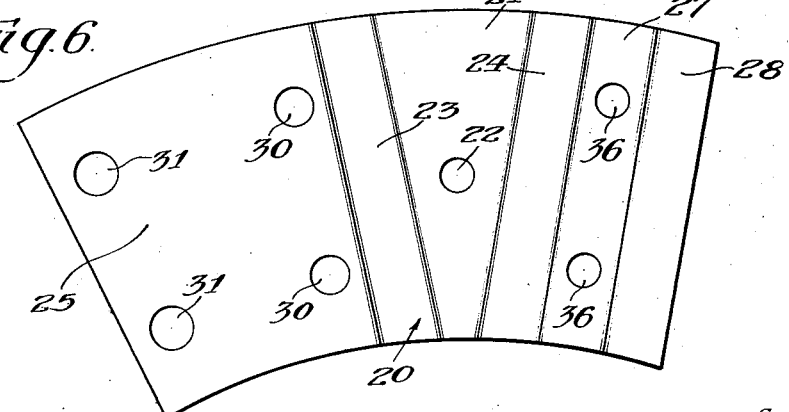
Inventor:
George E. Pope.
By: Lee J. Gary
Attorney Patented Dec. 14, 1937

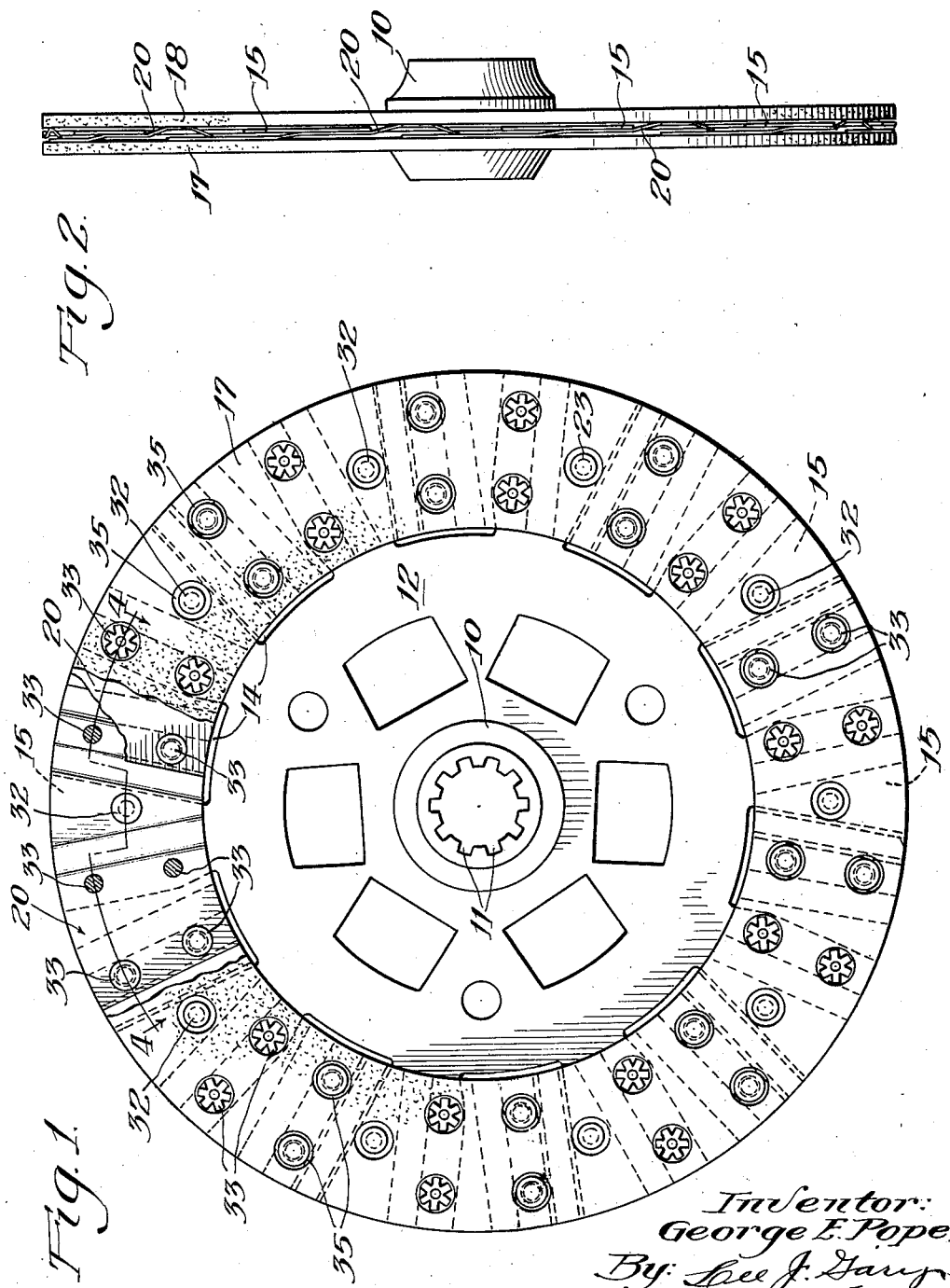

2,102,280

UNITED STATES PATENT OFFICE 2,102,280

CUSHIONED CLUTCH PLATE

George E. Pope, Stratford, Conn., assignor to Raybestos-Manhattan, Inc., Bridgeport, Conn., a corporation of New Jersey Application April 17, 1937, Serial No. 137,461

14 Claims. (Cl. 192—107)

This invention relates to improvements in friction clutch plate constructions, such as used in automobiles, and more particularly to clutch plates of the type including a pair of axially spaced friction facing elements constructed to provide resilient or cushioned engagement between the driving and driven member.

Heretofore, many clutch plate constructions have been proposed which were intended to provide resilient and smooth engagement, and in practically all cases such advantages were obtained at the sacrifice of efficiency and excessive and non-uniform wear of the friction facings at confined areas or zones, thus greatly reducing the life of the facings. Clutch constructions now in common use, in addition to being subject to the disadvantages mentioned, are also objectionable because of the lack of smooth engagement, resulting in chattering.

The clutch plate assembly embodying the present invention, obviates the foregoing disadvantages and provides one hundred (100%) percent engagement of the friction surface, insuring uniform wear of the entire friction area and greatly prolonging the life of the friction facings. My novel clutch plate assembly comprises a mounting plate, a pair of spaced apart annular friction facing elements disposed in juxtaposed relation on opposite sides of the mounting plate and an annular series of circumferentially spaced sectoral leaf spring elements connecting the facing elements to the mounting plate and to each other. These spring elements are formed and connected in a manner so that upon compression of the facing elements toward each other, one of the facings is caused to rotate a slight amount relatively to the other, and said connections are such as to provide a multiplicity of circumferentially spaced apart stop shoulders for limiting the amount of axial separation of the facings for maintaining them in parallel relation to each other. By virtue of such construction, the facings pick up the torque load in a smooth, uniform manner, free from chatter, with the facings remaining substantially parallel to each other at all times, and insuring uniform engagement of the entire friction areas of the facing elements.

Other objects and advantages of my improved clutch plate construction will be apparent from the following description taken in connection with the accompanying drawings, in which:—

Fig. 1 is a face view, with parts broken away, of a clutch plate assembly embodying this invention.

Fig. 2 is an edge view of the clutch plate assembly.

Fig. 3 is a fragmentary plan view of the mounting plate.

Fig. 4 is an enlarged, staggered sectional view through the assembly, taken at line 4—4 on Fig. 1, showing the position of the facing elements in inoperative position.

Fig. 5 is a view similar to Fig. 4, showing the relation of the parts in operating position.

Fig. 6 is an enlarged face view of one of the leaf spring elements.

In the illustrated embodiment of my invention shown in the drawings, the clutch plate assembly includes a supporting hub 10, which is provided with internal splines 11, providing axial non-rotative movement on a clutch shaft (not shown) on which it is to be mounted. It is to be understood that the hub is provided with a suitable flange to which is secured, by suitable fastening elements, a mounting plate or spider 12, which is of generally circular form. The marginal edge of the mounting plate is formed with a multiplicity of circumferentially spaced apart notches 14, and the portions intermediate adjacent notches, and designated at 15, serve as mounting fingers.

A pair of axially spaced apart annular friction facing elements 17 and 18 are disposed in parallel relation on opposite sides of the mounting plate, and are connected to the mounting plate and to each other by a multiplicity of circumferentially spaced sectoral leaf spring elements 20, formed of suitable spring metals. Each spring element, as seen in Fig. 6, is formed with a flat intermediate portion 21, provided with an aperture 22 which is adapted to be registered with an aperture 15ª of one of the fingers 15 of the mounting plate 12, for rigid and permanent connection thereto by a rivet 32. On opposite sides of the flat portion 21 of each spring are oppositely inclined portions 23 and 24, the former continuing into a flat portion 25 and the latter merging into a flat portion 27, continuing into a reversely inclined portion 28. The flat portions 21, 25 and 27, although disposed in lateral offset relation, extend in planes substantially parallel to each other.

The flat portion 25 of each spring element is provided with two sets of circumferentially spaced apertures 30 and 31, the apertures of each set preferably being radially aligned. The apertures 30, are adapted to be aligned with enlarged apertures 15ᵇ of the same finger 15, to which the spring is connected by the rivet 32, and the portion 25 of the spring is firmly secured to the inner surface of the facing element 18 by double shouldered rivets 33, which includes a small body 33ª and a larger body 33ᵇ, and the shoulder formed therebetween serving as a head to engage the spring portion 25, as seen in the drawings. The larger portion 33ᵇ extends freely through the larger aperture 15ᵇ of the finger 15, with a head 33ᶜ spaced a sufficient distance to engage the surface of the finger, as seen in Fig. 4, to limit the amount of separation of the mounting plate relative to the facing element 18, due to the normal tension in the spring element.

The adjacent spring elements are disposed in overlapping relation and said overlapping portions are connected together and to the facing elements in a manner which also permits a limited amount of axial separation of the facing elements. As may be seen in Fig. 6, the flat portion 27 of the spring is provided with a pair of radially aligned apertures 36 through which extend double shouldered rivets 33, for rigidly attaching the spring to the other facing element 17, while the enlarged portion 33ᵇ of the rivet extends through the large apertures 31 of the overlapping portion 25 of the next adjacent leaf spring. It is to be understood that the apertures 15ᵇ in the fingers 15 of the mounting plate 12 and the apertures 31 in the flat portion 25 of the spring are substantially larger than the enlarged portion 33ᵇ of the rivets 33 for permitting an unobstructed limited amount of rotation of one friction facing element relative to the other, when the elements are axially compressed in normal operation, as seen in Fig. 5. Each of the friction facings are provided with enlarged apertures 35, opposite the rivets 32 and the heads 33ᶜ of the rivets 33 to facilitate assembly of the device and also to provide adequate clearance for the heads of said rivets when one facing element is rotated relatively to the other, as seen in Fig. 5.

By virtue of the construction described, it will be apparent that the friction facings 17 and 18 are resiliently urged apart a definite distance by the leaf springs 20, and are limited in the amount of axial separation by the heads 33ᶜ of the rivets 33, thus always maintaining said facings in parallel relation to each other when in expanded or separated relation. As above mentioned, when the facings are compressed toward each other, in operation, the springs 20 act as resilient cushions and the inclined portions 23, 24 and 28 tend to straighten out, with the edge of portion 28 of one spring sliding over portion 25 of the next adjacent spring. Such action increases the distance between the rivets 32 and next adjacent rivets 33, and due to the rigid mounting of each spring to both facings 17 and 18, one of said facings is caused to move an angular amount relatively to the other. Such movement of the facings insures a smooth and resilient pick up of the torque load, with full one hundred (100%) percent friction engagement of the operating surfaces of the facings. This type of engagement completely eliminates chattering and results in uniform wear of the operating surfaces of the facing elements, thus obtaining maximum life of the facings.

The cushioning springs 20, are formed and spaced to provide adequate support for the facing elements and prevent occurrence of what is known as "patterns" on facings. Such patterns usually follow the contour of the cushioning springs insofar as their lack of ability to apply uniform pressure to the facings. The construction herein disclosed insures maintaining the facings in as nearly parallel relation as possible during the engagement of the clutch while picking up full torque load.

Although I have shown and described a preferred embodiment of my invention, manifestly it is capable of modification and rearrangement without departing from the spirit and scope thereof. I do not, therefore, wish to be understood as limiting this invention to the precise construction herein disclosed, except as it may be so limited in the appended claims.

I claim as my invention:

1. An improved clutch plate, comprising a mounting plate, a pair of axially spaced apart annular friction facing elements disposed on opposite sides of said plate, resilient means connecting said facings to the mounting plate, and normally maintaining said facings in spaced relation to said plate, said means being formed so that upon compression of the facing elements toward each other one of said facing elements is moved an angular amount relatively to the other facing element for producing smooth and uniform clutch engagement, and means interconnecting said resilient means with said mounting plate for limiting the amount of axial separation of said facing elements.

2. An improved clutch plate, comprising a pair of axially spaced apart annular friction facing elements, a plurality of circularly spaced sectoral leaf springs interposed between said elements in overlapping end engagement, circumferentially spaced apart means for connecting each spring to both facing elements, and means for limiting the amount of axial separation of said facing elements.

3. An improved clutch plate, comprising a pair of axially spaced apart annular friction facing elements, a plurality of circularly spaced sectoral leaf springs interposed between said elements, circumferentially spaced apart means for connecting each spring to both facing elements, one end of each spring being laterally offset and disposed in overlapping relation to the end of the next adjacent spring, and means for limiting the amount of axial separation of said facing elements.

4. An improved clutch plate, comprising a mounting plate, a pair of axially spaced apart annular friction facing elements disposed on opposite sides of said plate, a plurality of circularly spaced sectoral leaf springs, circumferentially spaced apart means connecting each spring to both of said facing elements, and means interconnecting each spring with the mounting plate in a manner for limiting the amount of axial separation of the facing elements.

5. An improved clutch plate, comprising a mounting plate, a pair of axially spaced apart annular friction facing elements disposed on opposite sides of said plate, a plurality of circularly spaced sectoral leaf springs, said springs being formed so that upon compression of the facing elements toward each other one of said elements is moved an angular amount relatively to the other, and circumferentially spaced apart rivets connecting each spring to both of said facing elements, certain of said rivets being double shouldered and having interconnection with the mounting plate in a manner for limiting the amount of axial separation of the facing elements.

6. An improved clutch plate, comprising a mounting plate, a pair of axially spaced apart annular friction facing elements disposed on opposite sides of said plate, a plurality of circularly spaced sectoral leaf springs, said springs being formed so that upon compression of the facing elements toward each other one of said elements is moved an angular amount relatively to the other, and circumferentially spaced apart rivets connecting each spring to both of said facing elements, certain of said rivets being double shouldered and having interconnection with the mounting plate in a manner for limiting the amount of axial separation of the facing elements, said interconnection including an enlarged aperture in the mounting plate permitting relative angular movement of said plate and leaf springs upon compression of said facing elements.

7. An improved clutch plate, comprising a mounting plate, a pair of axially spaced apart annular friction facing elements disposed on opposite sides of said plate, a plurality of circularly spaced sectoral leaf springs, circumferentially spaced apart means connecting each spring to both of said facing elements, means rigidly connecting each spring to the mounting plate, and means interconnecting each spring with the mounting plate in a manner for limiting the amount of axial separation of the facing elements.

8. An improved clutch plate, comprising a mounting plate, a pair of axially spaced apart annular friction facing elements disposed on opposite sides of said plate, a plurality of circularly spaced sectoral leaf springs, said springs being formed so that upon compression of the facing elements toward each other one of said elements is moved an angular amount relatively to the other, means rigidly connecting each spring to the mounting plate, and circumferentially spaced apart rivets connecting each spring to both of said facing elements, certain of said rivets being double shouldered and having interconnection with the mounting plate in a manner for limiting the amount of axial separation of the facing elements.

9. An improved clutch plate, comprising a mounting plate, a pair of axially spaced apart annular friction facing elements disposed on opposite sides of said plate, a plurality of circularly spaced sectoral leaf springs, said springs being formed so that upon compression of the facing elements toward each other one of said elements is moved an angular amount relatively to the other, means rigidly connecting each spring to the mounting plate, and circumferentially spaced apart rivets connecting each spring to both of said facing elements, certain of said rivets being double shouldered and having interconnection with the mounting plate in a manner for limiting the amount of axial separation of the facing elements, said interconnection including an enlarged aperture in the mounting plate permitting relative angular movement of said plate and leaf springs upon compression of said facing elements.

10. An improved clutch plate, comprising a mounting plate, a pair of annular friction facing elements disposed in juxtaposed relation on opposite sides of the plate, a plurality of circularly spaced, sectoral leaf springs interposed between said facing elements, one end of each spring being laterally offset and disposed in overlapping relation to the end of the next adjacent spring, circumferentially spaced apart means connecting each spring to the mounting plate and to both facing elements, and means interconnecting the overlapping portions of adjacent springs in a manner for limiting the amount of axial separation of said facing elements.

11. An improved clutch plate, comprising a mounting plate, a pair of annular friction facing elements disposed in juxtaposed relation on opposite sides of the plate, a plurality of circularly spaced, sectoral leaf springs interposed between said facing elements, one end of each spring being laterally offset and disposed in overlapping relation to the end of the next adjacent spring, said springs being formed so that upon compression of the facing elements toward each other one of said elements is moved an angular amount relatively to the other, circumferentially spaced apart rivets connecting each spring to the mounting plate and to both facing elements, and double shouldered rivets interconnecting the overlapping portions of adjacent springs in a manner for limiting the amount of axial separation of the facing elements.

12. An improved clutch plate, comprising a mounting plate, a pair of annular friction facing elements disposed in juxtaposed relation on opposite sides of the plate, a plurality of circularly spaced, sectoral leaf springs interposed between said facing elements, one end of each spring being laterally offset and disposed in overlapping relation to the end of the next adjacent spring, said springs being formed so that upon compresison of the facing elements toward each other one of said elements is moved an angular amount relatively to the other, circumferentially spaced apart rivets connecting each spring to the mounting plate and to both facing elements, and double shouldered rivets interconnecting the overlapping portions of adjacent springs in a manner for limiting the amount of axial separation of the facing elements, one of said springs at the connection for the double shouldered rivet having an enlarged aperture to permit relative angular movement of the facing elements.

13. An improved clutch plate, comprising a mounting plate, a pair of annular friction facing elements disposed in juxtaposed relation on opposite sides of the plate, a plurality of circularly spaced, sectoral leaf springs interposed between said facing elements, one end of each spring being laterally offset and disposed in overlapping relation to the end of the next adjacent spring, circumferentially spaced apart means connecting each spring to the mounting plate and to both facing elements, means interconnecting each spring to the mounting plate and the overlapping portions of adjacent springs in a manner to limit the amount of axial separation of said facing elements.

14. An improved clutch plate, comprising a mounting plate, a pair of annular friction facing elements disposed in juxtaposed relation on opposite sides of the plate, a plurality of circularly spaced, sectoral leaf springs interposed between said facing elements, one end of each spring being laterally offset and disposed in overlapping relation to the end of the next adjacent spring, circumferentially spaced apart means connecting each spring to the mounting plate and to both facing elements, means interconnecting each spring to the mounting plate and the overlapping portions of adjacent springs in a manner to limit the amount of axial separation of said facing elements, said interconnecting means including double shouldered rivets rigidly connecting each spring to the opposed facing elements, and projecting through enlarged apertures formed in the mounting plate and the next adjacent spring respectively for permitting a limited amount of angular movement of the facing elements relatively to each other.

GEORGE E. POPE.